(12) United States Patent
Lo

(10) Patent No.: US 6,385,738 B1
(45) Date of Patent: May 7, 2002

(54) SYSTEM FOR TESTING TRANSMITTER LOGIC OF A PHYSICAL LAYER DEVICE IN A LOCAL AREA NETWORK

(75) Inventor: William Lo, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/280,648

(22) Filed: Mar. 29, 1999

Related U.S. Application Data

(60) Provisional application No. 60/082,183, filed on Apr. 17, 1998.

(51) Int. Cl.[7] ............................................. G06F 11/277
(52) U.S. Cl. .......................................... 714/25; 714/715
(58) Field of Search ............................ 714/25, 824, 36, 714/735, 47, 712, 715; 709/224; 713/400, 501, 600; 324/500; 375/376; 370/516, 908, 910

(56) References Cited

U.S. PATENT DOCUMENTS

| | | | | |
|---|---|---|---|---|
| 4,419,756 A | * | 12/1983 | Cheng-Quispe et al. |
| 4,649,538 A | * | 3/1987 | DeLuca et al. |
| 4,750,181 A | * | 6/1988 | McDonald et al. |
| 5,406,209 A | * | 4/1995 | Johnson et al. |
| 5,875,217 A | * | 2/1999 | Hartmann et al. |

* cited by examiner

Primary Examiner—Gopal C. Ray

(57) ABSTRACT

A physical layer device (PHY) device in an Ethernet LAN is configured to permit ease of testing of its transmitter logic. The PHY device comprises a reset extension circuit for latching on the clock signals from a phase-locked loop (PLL) after the PLL has stabilized upon power-up or reset. The PHY device transmits a known valid bit pattern for testing purposes. A signal analyzer receives the transmitted bit pattern from the PHY device and compares the received bit pattern with a known valid bit pattern. A match indicates the proper operation of the PHY device transmitter logic.

17 Claims, 6 Drawing Sheets

SYSTEM FOR TESTING TRANSMITTER LOGIC OF A PHYSICAL LAYER DEVICE IN A LOCAL AREA NETWORK

RELATED U.S. APPLICATION DATA

This application claims the benefit of U.S. Provisional application Serial No. 60/082,183, filed Apr. 17, 1998, the disclosure of which is incorporated by reference herein in its entirety.

BACKGROUND OF THE INVENTION

1. Technical Field

The present invention relates to testing of data communication networking devices, more particularly to a transceiver employed in an Ethernet type network.

2. Background Art

Device testing plays a critical role in the manufacturing of networking equipment. Manufacturers are continually seeking ways to produce this equipment more economically. One way of accomplishing this is to reduce testing costs. Because of the prevalence of local area networks, a small cost reduction measure translates into a competitive edge in the marketplace.

Local area networks use a network cable or other network media to link nodes (e.g., workstations, routers and switches) to the network. Each local area network architecture uses a media access control (MAC) enabling network interface device at each network node to share access to the media. Physical (PHY) layer devices are configured for translating digital packet data received from a MAC across a standardized interface, e.g., a Media Independent Interface (MII), into an analog signal for transmission on the network medium, and reception of analog signals transmitted from a remote node via the network medium. An example is the 100Base-TX Ethernet (IEEE Standard 802.3u) transceiver, which is configured for transmitting and receiving a Multi-level Transmission-3 (MLT-3) encoded analog signal over unshielded (or shielded) twisted pair copper wiring. To transmit an MLT-3 encoded signal across the media, 4-bit codes from the MII are supplied to a 4B/5B (4 bit/5 bit) encoder. The newly generated 5-bit symbols are serialized and outputted onto the physical media as MLT-3 encoded signals at 125 Mbps. The physical channel rate of 125 Mbps results from use of a 25 MHz internal clock that is multiplied by 5. At the receive end, the physical channel rate of 125 Mbps is effectively reduced to a 100 Mbps physical layer interface because the received 5-bit symbols are decoded back into 4-bit MII codes (i.e., nibbles). Although the physical channel rate is 125 MHz, the MII utilizes a 25 MHz clock. To maintain the 125 MHz rate, a digital phase-locked loop (PLL) recovers the clock information, and a deserializer performs a serial to parallel conversion in which one serial bit translates to 5 outgoing parallel bits at 25 MHz.

In testing the transmitter logic of a PHY device, determining the proper polarity of the encoded signals poses a problem. On the transmit side of the PHY device, a phase-locked loop (PLL) multiplies the 25 MHz clock up to 125 MHz. At power up or reset, the PLL requires a period of time to calibrate itself. The number of 125 MHz clock cycles that are generated until calibration of the PLL is not determinable. That is, the number of transitions that occur during the period of calibration is unknown, despite the fact that the PHY device is the source of the transmission. Factors that contribute to the non-deterministic nature of the clock cycles include the unknown initial state of the PLL, process variation, and temperature and voltage at the time of power-up. Under normal operations, the non-deterministic nature of the number of clock cycles is a "don't care" during power up. However, this non-deterministic characteristic causes problems during device testing, which is typically performed prior to shipping of the device. Testers compare the output of the PHY device against a known set of signal/bit patterns on a cycle by cycle basis. In a test environment, certain context-specific information (e.g., polarity) are not present.

FIG. 1 shows a NRZI (Non-return to Zero Interface) signal generated from a NRZ (Non-return to Zero) signal. As shown, there exists two possible initial states, state 1 and state 2, for the NRZI signal. With NRZI signaling, only transitions and non-transitions convey information. In other words, a symbolic "1" is shown by a transition; a symbolic "0" is marked by no transition. Because the initial state of the NRZI signal is unknown, the incorrect (i.e., opposite) polarity may be employed in the transmission of the NRZI signals. In FIG. 1, an exemplary NRZ bit stream 01101001111001 is to be transmitted via a PHY device. State 1 assumes the initial level is 0; accordingly when the first 1 occurs at 101, the signal transitions from 0 to 1. The next transition is at 103 corresponding to the second 1. The transition alternates from high to low and then low to high with subsequent transitions, as seen from transition points 105, 107, 109, 11 1, and 113, until the end of the bit sequence. However, if the initial state is state 2, the waveform exhibits the opposite polarity of the state 1 waveform. For example, at the first logical high point 101, the waveform of state 2 transitions from high to low, in contrast to low to high of the state 1 waveform. Because these initial states are unknown, the tester may compare the wrong waveform against the output waveform of the PHY device, resulting in an invalid test result.

This problem is magnified with an MTL-3 signal, as shown in FIG. 2. Although MTL-3 signaling is marked by three signal levels, there are four possible initial states. Two possible states stem from the zero level as in states 1 and 2 in which the waveform may transition up or down with the first occurrence of a 1 (301). With the exemplary bit stream, 0110100111001, the state 1 waveform transitions from 0 to 1 at 201 and 209. At 203 and 211, the transition is from 1 to 0. Further, and 213, the state 1 waveform transitions from 0 to −1. A −1 to 0 transition occurs at 207. The waveform of state 2 exhibits the opposite polarity of state 1. For example, at 201 and 209, the state 2 waveform transitions from 0 to −1, instead of 0 to 1 as in the case of state 1. Regarding states 3 and 4, the waveforms associated with these states are also opposite in polarity. State 3 has an initial level of 1; whereas, the waveform of state 4 begins with a −1. The state 3 waveform transitions from 1 to 0 at 215 and 221, and from 0 to −1 at 217 and 223. Transition from −1 to 0 occurs at 219 and 225. At 220, the transition is from 0 to 1. In state 4, the transitions at these various points are opposite in polarity. That is, at 215 and 221, the state 4 waveform transitions from −1 to 0. At 219 and 225, the transition is from 1 to 0. The transition at 215 and 221 is from −1 to 0. The many possible initial polarity states create obstacles for testing while the PLL is stabilizing.

Because the NRZI signals and the MTL-3 signals possess multiple initial states, a test that incorrectly assumes a wrong state would yield inaccurate test results resulting in costly rejections of possibly properly functioning devices. A conventional approach attempts to address this problem by capturing all the various waveforms and performing "back-end" processing. Back-end logic refers to processing capabilities of other components or logic external to the PHY device as well as higher layer protocol processes. A major disadvantage with the conventional approach is that back-end processing is usually not feasible because of costs. Moreover, such an approach is time consuming, which translates into higher production costs.

SUMMARY OF THE INVENTION

There is a need for an arrangement for deterministically identifying the polarity of transmitted signals. There is also a need for an arrangement that reduces testing time by eliminating the requirement of performing back-end processing.

These and other needs are attained by the present invention, where a system for testing a networking device comprises a phase-locked loop (PLL) for generating a transmit clock signal in response to a basic clock signal. A reset extension circuit latches the basic clock signal and the transmit clock signal when the PLL stabilizes, and also generates a secondary reset signal. A physical layer (PHY) device generates encoded signals that represent a known valid bit pattern, wherein an initial polarity state of the encoded signals is based upon the secondary reset signal. A signal analyzer circuit checks whether a transmitted bit pattern associated with the generated encoded signals matches the known valid bit pattern. The signal analyzer decodes the encoded signals and compares the transmitted bit pattern with the known valid bit pattern. A match between the transmitted bit pattern and the known valid bit pattern indicates that the operation of the PHY device is in accordance with a prescribed operation. Because the polarity of the encoded can be readily determined, testing can be performed without the need for back-end processing.

According to one aspect of the present invention, a system for testing a networking device comprises a physical layer (PHY) device generating encoded signals that represent a known valid bit pattern. The PHY device comprises: a phase-locked loop (PLL) for generating a transmit clock signal in response to a basic clock signal; and a reset extension circuit for latching the basic clock signal and the transmit clock signal when the PLL stabilizes, and for generating a secondary reset signal. An initial polarity state of the encoded signals is based upon the secondary reset signal. A signal analyzer circuit checks whether a transmitted bit pattern associated with the generated encoded signals matches the known valid bit pattern. The signal analyzer decodes the encoded signals and compares the transmitted bit pattern with the known valid bit pattern. A match between the transmitted bit pattern and the known valid bit pattern indicates that the operation of the PHY device is in accordance with a prescribed operation. Hence, with the above arrangement, production costs can be significantly curbed by reduction of testing time.

Still another aspect of the present invention provides a method for deterministically testing transmitter logic of a PHY device. The method comprises generating and a transmit clock signal by a phase-locked loop (PLL) in response to a basic clock signal. The method also includes computing a period for the PLL to stabilize upon reset or power-up and latching the basic clock signal and the transmit clock signal based upon the computed period. A secondary reset signal is generated in response to the transmit clock signal. The method further comprises generating encoded signals based upon a known valid bit pattern, whereby the encoded signals exhibit an initial polarity state that is determined based upon the secondary reset signal and the transmit clock signal. In addition, the method includes decoding the encoded signals to yield a transmitted bit pattern, and then, comparing the transmitted bit pattern with the known valid bit pattern. A match between the transmitted bit pattern and the known valid bit pattern indicates that the operation of the transmitter logic is in accordance with a prescribed operation. With this method, the initial polarity state of the encoded signals is made deterministic.

Additional advantages and novel features of the invention will be set forth in part in the description which follows, and in part may become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Although the present invention has direct applicability to testing of a 100Base-TX networking device, it will become apparent that the present invention is also applicable to other PHY layer devices and other Ethernet type signaling protocols (e.g., IEEE 802.3).

The ability to quickly test a device, in this case the transmitter side of a PHY device 309 (FIG. 3), is highly valued in the data communications industry. Conventional methods of testing examine all the waveforms emanating from the PHY device during power-up or reset. These waveforms are then processed at the back-end to identify the polarity of the output signals of the PHY device. As indicated earlier, in a testing scenario, back-end logic is not usually available because of cost constraints. The present invention, however, provides an arrangement whereby the transmit logic of a PHY device can be tested without having to perform back-end processing. Under this testing arrangement, the PHY device generates encoded signals that represent a known valid bit pattern. To generate these encoded signals with a known polarity, the PHY device utilizes a reset extension circuit. Upon a reset, a counter increments up to a predetermined value that corresponds to the period required for the PLL to stabilize. The edge of the 25 MHz clock as well as the edge of the 125 MHz clock is latched at this time. Further, a secondary reset signal is outputted from the reset extension circuit when this value is reached. Based upon the secondary reset signal, encoded signals are transmitted from the PHY device to a signal analyzer. The signal analyzer compares the bit pattern from the received encoded signals with a known valid bit pattern. A match indicates that the PHY device is operating properly.

Figure 1:
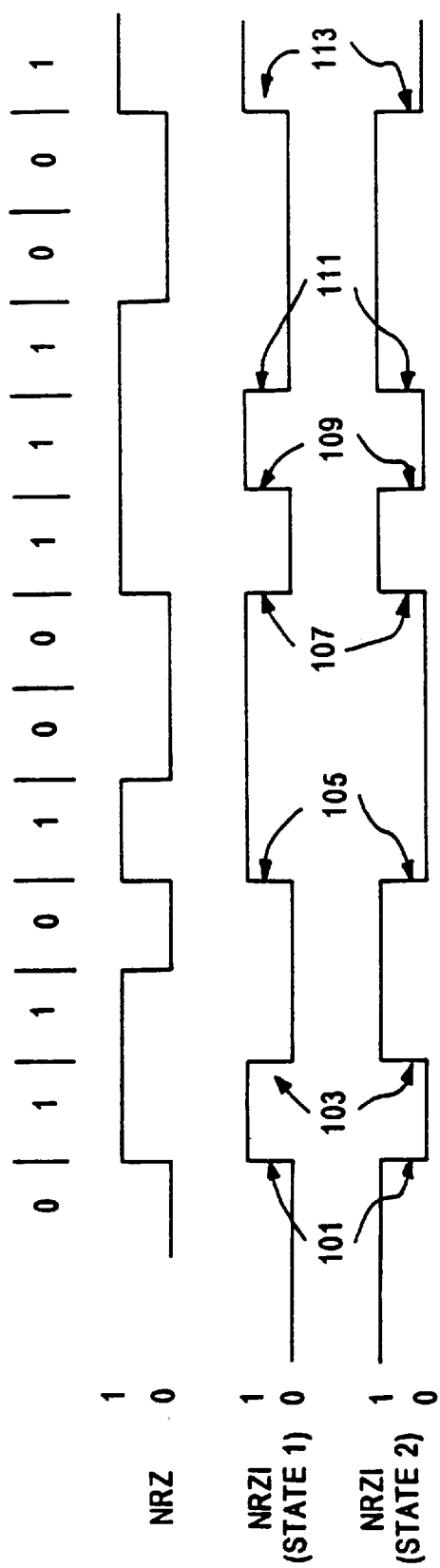
FIG. 1 is a diagram of exemplary waveforms associated with a NRZI signal.
Figure 2:
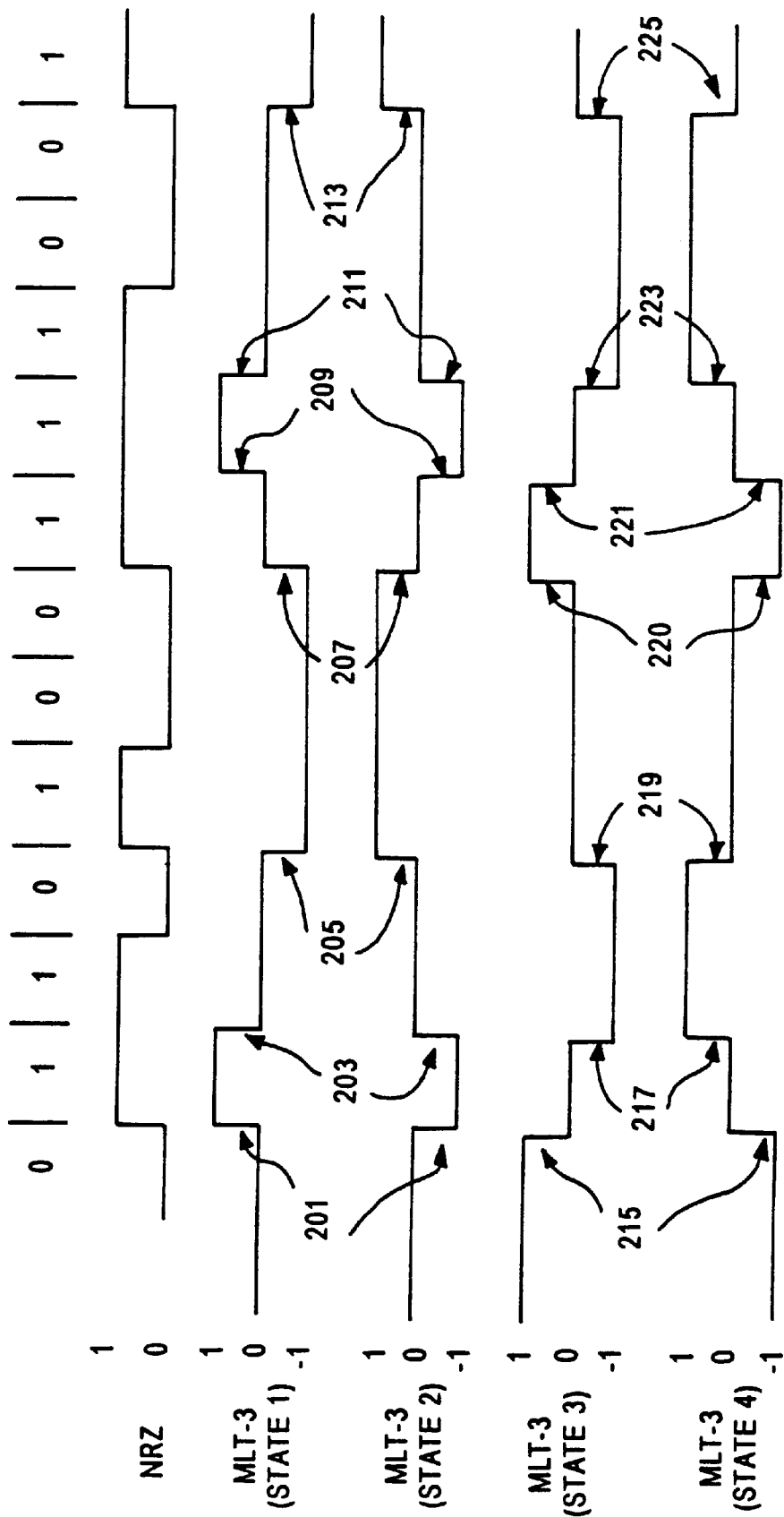
FIG. 2 is a diagram of exemplary waveforms associated with a MLT-3 signal.
Figure 3:
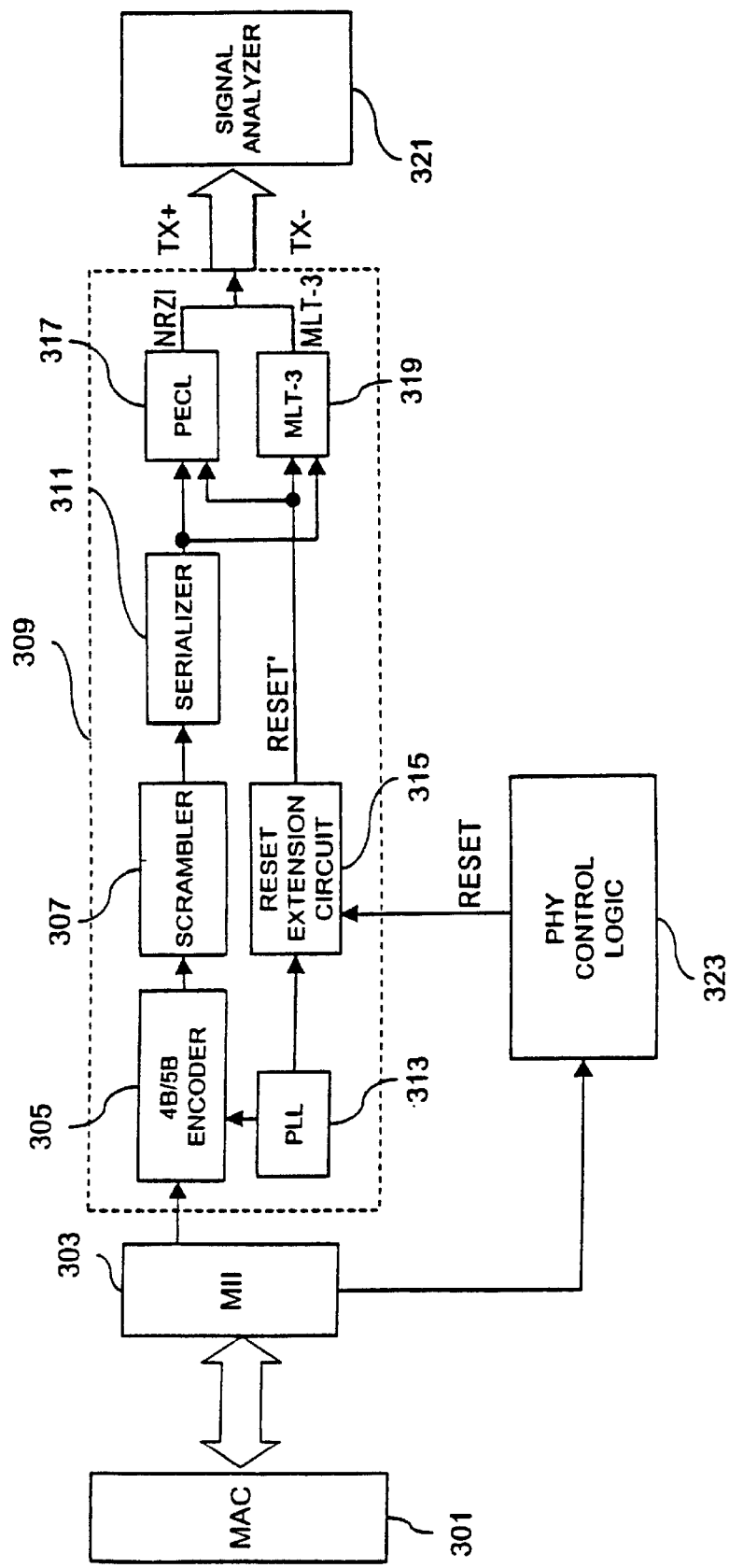
FIG. 3 is a diagram illustrating a system for testing a PHY device according to an embodiment of the present invention.

FIG. 3 illustrates the testing system 300 in accord with an embodiment of the present invention. As shown, a PHY device 309 interacts with a media independent interface (MII) 303 to communicate with the media access control (MAC) 301. The MAC 301 sends data to the MII 303 for transmission via the PHY device 309. In test operation, the PHY device 309 is responsible for transmitting signals from the MII 303 to a signal analyzer 321. The signals from the MII 303 are 4-bit transmit data signals (TXD[3:0]), which are inputted to a 4B/5B encoder 305. The 4B/5B encoder 305 converts the 4-bit nibbles into 5-bit code groups (symbols) using a 4B/5B block coding scheme.

Additionally, the 4B/5B encoder 305 inserts JK delimiter symbols at the start of the data stream (i.e., physical protocol data unit). Thereafter, the scrambler 307 reduces the repetitive data patterns found in the 5-bit symbols by adding randomly generated bits. The operation of the scrambler 307, for example, may follow the 100Base-TX standard.

Next, the serializer 311 converts the scrambled 5-bit symbols into a NRZ serial bit stream. The PECL (Pseudo-Emitter Coupled Logic) circuit 317 produces PECL compatible NRZI signals in response to a secondary reset signal from the reset extension circuit 315. PECL NRZI signals are typically transmitted by the PHY device 309 during 100Base-TX operations. The PECL circuit 317 outputs NRZI signals that exhibit an initial polarity state associated with a known waveform. PLL 313 generates a 125 MHz clock based upon a 25 MHz clock input; the 125 MHz clock is supplied to the reset extension circuit 315. The 25 MHz clock may be provided from a source external or internal to the PHY device 309. For 100Base-TX operations, MLT-3 signals are transmitted via the MLT-3 circuit 319. The MLT-3 circuit 319 receives the secondary reset signal and accordingly performs translation of the NRZ bit stream into MLT-3 signals in a manner that orients these MLT-3 signals with the proper initial polarity. Because the initial polarity is deterministic, the signal analyzer 321 can correctly interpret the data packet it receives from the PHY device 300; as will be described with respect to FIG. 6. In a testing situation, the PHY device 309 would transmit encoded signals that represent a known valid bit pattern. The signal analyzer 321 compares the transmitted bit pattern contained in the receive data packet with the known valid bit pattern. If the bit patterns coincide, then the tester knows that the PHY device 309 has performed correctly.

Figure 4:
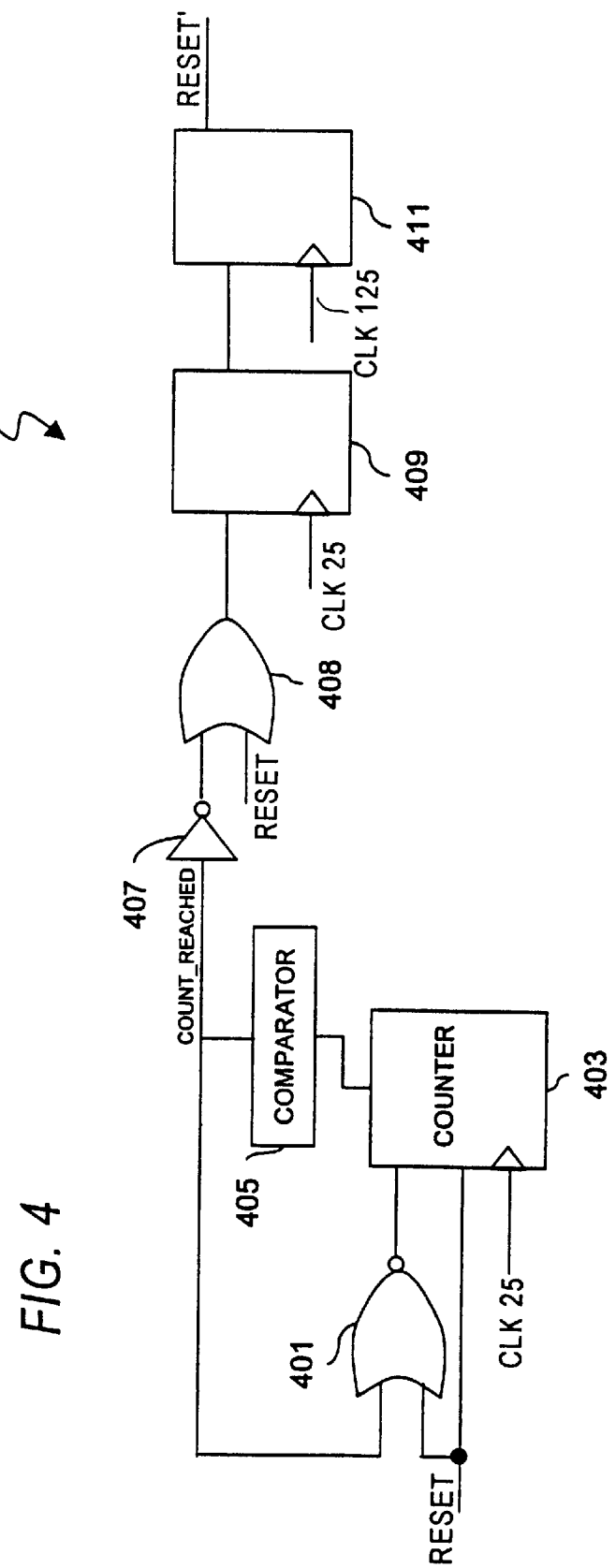
FIG. 4 is a diagram illustrating a reset extension circuit in accord with one embodiment of the present invention.

FIG. 4 illustrates the preferred embodiment of the reset extension circuit 315. The reset extension circuit 315 generates a secondary reset signal (RESET') when the 25 MHz clock and the 125 MHz clock stabilize—i.e., after calibration of the PLL 313. A NOR gate 401 outputs to a counter 403 in response to a RESET signal that is based on the 25 MHz clock. The RESET signal, in one exemplary configuration, originates from a PHY Control logic 323, which is coupled to the MII 303; the PHY Control logic 323 serves, among other functions, to control and gather status information on the PHY device 309. A counter 403 within the reset extension circuit 315 begins incrementing once the RESET signal is deasserted and ceases at a stop value, K. This count value, K, corresponds to the time necessary for the PLL 313 to stabilize. Hence, the stabilization time is equal to K multiplied by the period of the clock. Once the comparator 405 identifies the stop value K, it holds that count value and outputs a COUNT_REACHED signal. The comparator 405 couples to an inverter 407, which outputs an inverted COUNT_REACHED signal to OR gate 408. The OR gate 408 outputs to a flip-flop 409 in response to the RESET signal. Flip-flop 409 latches to the 25 MHz clock when the RESET signal deasserts and the comparator 405 has identified the stop value K. Similarly, flip-flop 411 latches to the 125 MHz clock. Subsequently, flip-flop 411 outputs the RESET' signal, which is supplied to the PECL circuit 317 and the MLT-3 circuit 319. Thus, once a RESET signal is received from the PHY control logic 323, comparator 405 provides a mechanism to identify when the PLL 313 (FIG. 3) has stabilized, thereby permitting the reset extension circuit 315 to synchronize to both the 25 MHz clock and the 125 MHz clock. Upon latching the two clocks, the reset extension circuit 315 outputs the RESET' signal.

Figure 5:
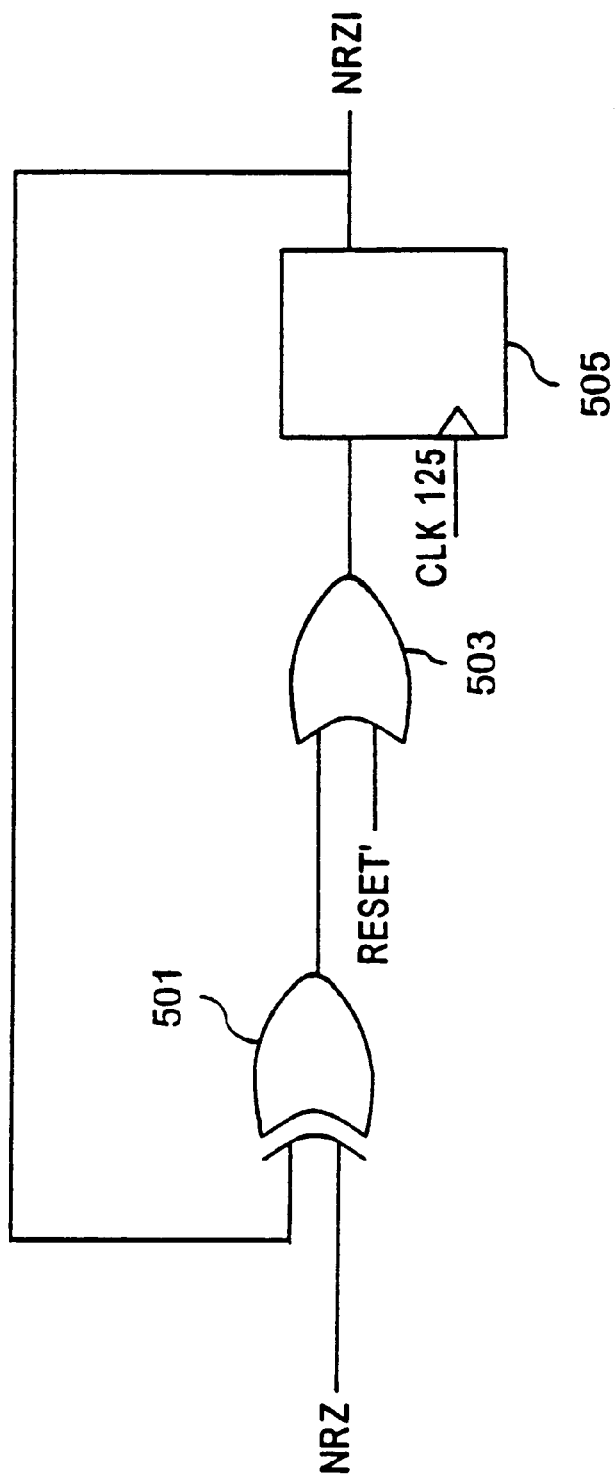
FIG. 5 is a diagram illustrating a PECL (Pseudo-Emitter Coupled Logic) circuit according to an embodiment of the present invention.

As shown in FIG. 5, the PECL circuit 317 generates the NRZI signal based upon the RESET' signal from the reset extension circuit 315. An XOR gate 501 outputs to an OR gate 503 in response to an NRZ signal received from the serializer 311. The OR gate 503, in response to the RESET' signal, then outputs a signal to flip-flop 505. The flip-flop 505 outputs an NRZI signal in response to the 125 MHz clock. The output of flip-flop 505 is fed back to one of the inputs of the XOR gate 501. With the RESET' signal, the PECL circuit 317 properly generates the NRZI signals such that these signals have a known polarity state. This is accomplished by causing the latch 505 to hold a 1 value until the RESET' signal deasserts, whereby the NRZ signal governs the output.

Because the clocks are stable (as indicated by the assertion of the RESET' signal), the polarity of the NRZI signals can be readily identified. During the transient state of the PLL 313, the polarity of the clock signals (e.g., 125 MHz) may change. However, by waiting until the PLL 313 stabilizes, the signal analyzer 321 may rely on the fact that the outputted waveform of the PHY device 309 is a "true" output. The signal analyzer 321 can then compare the outputted NRZI signals of the PECL circuit 317 to a predetermined waveform. In a similar fashion, MLT-3 signals are generated with a known polarity.

Figure 6:
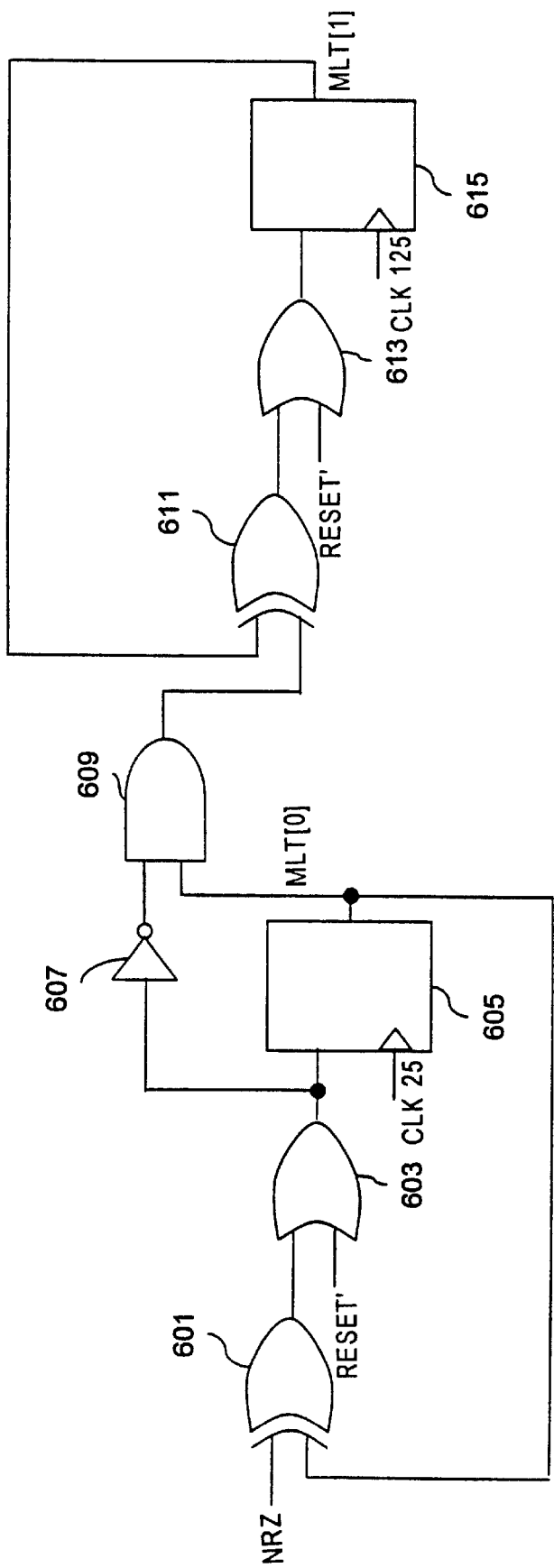
FIG. 6 is a diagram illustrating a MLT-3 signal generation circuit according to an embodiment of the present invention.

FIG. 6 shows an MLT-3 circuit 319 that identifies the polarity state associated with the MLT-3 signals. The RESET' signal holds the flip-flops (i.e., latches) 605 and 615 to a known state. The latches 605 and 615 are high until the RESET' signal is deasserted; at which time, the normal operation of the transmitter is resumed. An XOR gate 601 outputs to OR gate 603 in response to an NRZ signal from the serializer 311. In turn, the OR gate 603 outputs to flip-flop (or latch) 605, which is synchronized to the 125 MHz clock. Latch 605 outputs an MLT[0] signal to AND gate 609, which outputs to another XOR gate 611 . The MLT[0] signal feeds back to the other input of XOR gate 601. The output of OR gate 603 is also input to an inverter 607. Inverter 607 outputs a signal to AND gate 609. Latches 605 and 615 each holds a value of 1 until the RESET' signal is deasserted. The second latch 615 outputs signal MLT[1] in response to the output of OR gate 609 and the 125 MHz transmit clock. The MLT[1] signal is fed back to XOR gate 611. The signals, MLT[0] and MLT[1], together represent the tri-levels of MLT-3 encoded signals with proper initial polarity. The truth table below provides an example of an MLT-3 encoding scheme resulting from the values of the MLT[0] and MLT[1] signals.

| MLT[0] | MLT[1] | State |
|--------|--------|-------|
| 0 | 0 | 0 |
| 1 | 0 | +1 |
| 1 | 1 | −1 |
| 0 | 1 | 0 |

In the above table, the latched values of 0 0 and 0 1 at flip-flops 605 and 615 correspond to a 0 level of the MLT-3 encoded signals. If the latches 605 and 615 hold the values 1 and 0 respectively, a symbolic +1 is transmitted. A symbolic −1 results from the latch 605 holding a 1 and the latch 615 holding a 1. In effect, the RESET' signal serves to halt the operation of the MLT-3 circuit 319 until the PLL 313 calibrates (i.e., stabilizes).

According to the disclosed embodiment, the reset extension circuit advantageously permits an accurate identification of the initial polarity state associated with encoded signals that are to be transmitted. In this manner, testing of the transmitter logic of a PHY device can be readily performed without the need for back-end processing. From a testing standpoint, identification of the polarity of the first bit of the bit pattern enables a proper comparison between the transmitted bit pattern with a known valid bit pattern. With the present invention, the testing time is greatly reduced during the manufacturing and production of the PHY devices, resulting in significant cost savings.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A system for testing a networking device comprising:
   a phase-locked loop (PLL) for generating a transmit clock signal in response to a basic clock signal;
   a reset extension circuit for latching the basic clock signal and the transmit clock signal when the PLL stabilizes, and for generating a secondary reset signal;
   a physical layer (PHY) device generating encoded signals that represent a known valid bit pattern, wherein an initial polarity state of the encoded signals is based upon the secondary reset signal; and
   a signal analyzer circuit for checking whether a transmitted bit pattern associated with the generated encoded signals matches the known valid bit pattern by decoding the encoded signals and comparing the transmitted bit pattern with the known valid bit pattern, a match between the transmitted bit pattern and the known valid bit pattern indicating operation of the PHY device in accordance with a prescribed operation.

2. The system as in claim 1, wherein the reset extension circuit comprises:
   a counter for incrementing to a stop value that corresponds to a period required for the PLL to stabilize;
   a first flip-flop for latching the basic clock signal and providing an output signal in response to a reset deassert signal and upon the counter reaching the stop value; and
   a second flip-flop coupled to the first flip-flop for latching the transmit clock signal and outputting the secondary reset signal in response to the reset deassert signal and upon the counter being incremented to the stop value.

3. The system as in claim 1, further comprising a PECL (Pseudo-Emitter Coupled Logic) circuit for generating an NRZI signal with the initial polarity state, the PECL circuit comprising:
   an XOR gate for receiving an NRZ signal at a first input;
   an OR gate for receiving an output signal of the XOR gate and the secondary reset signal; and
   a flip-flop for outputting the NRZI signal in response to an output signal of the OR gate and the basic clock signal, the NRZI signal being fed back to a second input of the XOR gate.

4. The system as in claim 1, wherein the PHY device comprises a multi-level transmission-3 (MLT-3) circuit for generating a MLT-3 signal with the initial polarity state, the MLT-3 circuit comprising:
   a first XOR gate for receiving a NRZ signal at a first input;
   a first OR gate for receiving the secondary reset signal and an output signal from the first XOR gate;
   a first flip-flop for generating a first MLT-3 signal in response to an output signal of the first OR gate and the transmit clock signal, the first MLT-3 signal being fed back to a second input of the first XOR gate;
   an inverter for receiving the output of the first OR gate;
   an AND gate for receiving the output of the inverter and the first MLT-3;
   a second XOR gate for receiving the output of the AND gate;
   a second OR gate for receiving the output of the second XOR gate and the secondary reset signal; and
   a second flip-flop for generating a second MLT-3 signal in response to an output signal of the second OR gate and the transmit clock signal, the second MLT-3 signal being fed back to a second input of the second XOR gate.

5. The system as in claim 1, wherein the basic clock signal has a frequency of 25 MHz and the transmit clock signal has a frequency of 125 MHz.

6. The system as in claim 1, wherein the encoded signals conform to an IEEE 802.3 protocol.

7. A system for testing a networking device comprising:
   a physical layer (PHY) device generating encoded signals that represent a known valid bit pattern, the PHY device comprising,
      a phase-locked loop (PLL) for generating a transmit clock signal in response to a basic clock signal;
      a reset extension circuit for latching the basic clock signal and the transmit clock signal when the PLL stabilizes, and for generating a secondary reset signal,
   wherein an initial polarity state of the encoded signals is based upon the secondary reset signal; and
   a signal analyzer circuit for checking whether a transmitted bit pattern associated with the generated encoded signals matches the known valid bit pattern by decoding the encoded signals and comparing the transmitted bit pattern with the known valid bit pattern, a match between the transmitted bit pattern and the known valid bit pattern indicating operation of the PHY device in accordance with a prescribed operation.

8. The system as in claim 7, wherein the reset extension circuit comprises:
   a counter for counting clock cycles and incrementing to a stop value that corresponds to a period for the PLL to stabilize;

a first flip-flop for latching the basic clock signal in response to a reset deassert signal and upon the counter being incremented to the stop value; and a second flip-flop coupled to the first flip-flop for latching the transmit clock signal and outputting the secondary reset signal in response to the reset deassert signal and upon the counter reaching the stop value.

9. The system as in claim 7, further comprising a PECL circuit for generating a NRZI signal with the initial polarity state, the PECL circuit comprising:

an XOR gate for receiving a NRZ signal at a first input lead;

an OR gate for receiving an output signal of the XOR gate and the secondary reset signal; and a flip-flop for outputting the NRZI signal in response to an output signal of the OR gate and the basic clock signal, the NRZI signal being fed back to a second input lead of the XOR gate.

10. The system as in claim 7, wherein the PHY device comprises a multi-level transmission-3 (MLT-3) circuit for generating a MLT-3 signal with the initial polarity state, the MLT-3 circuit comprising:

a first XOR gate for receiving a NRZ signal at a first input;

a first OR gate for receiving the secondary reset signal and an output signal from the first XOR gate;

a first flip-flop for generating a first MLT-3 signal in response to an output signal of the first OR gate and the transmit clock signal, the first MLT-3 signal being fed back to a second input of the first XOR gate;

an inverter for receiving the output of the first OR gate;

an AND gate for receiving the output of the inverter and the first MLT-3;

a second XOR gate for receiving the output of the AND gate;

a second OR gate for receiving the output of the second XOR gate and the secondary reset signal; and a second flip-flop for generating a second MLT-3 signal in response to an output signal of the second OR gate and the transmit clock signal, the second MLT-3 signal being fed back to a second input of the second XOR gate.

11. The system as in claim 7, wherein the basic clock signal has a frequency of 25 MHz and the transmit clock signal has a frequency of 125 MHz.

12. The system as in claim 7, wherein the encoded signals conform to an IEEE 802.3 protocol.

13. A method for deterministically testing transmitter logic of a physical layer (PHY) device, the method comprising:

generating a transmit clock signal by a phase-locked loop (PLL) in response to a basic clock signal;

latching the basic clock signal and the transmit clock signal when the PLL stabilizes;

supplying a secondary reset signal in response to the transmit clock signal;

generating encoded signals based upon a known valid bit pattern, the encoded signals exhibiting an initial polarity state that is determined based upon the secondary reset signal;

decoding the encoded signals to yield a transmitted bit pattern; and comparing the transmitted bit pattern with the known valid bit pattern, a match between the transmitted bit pattern and the known valid bit pattern indicating operation of the transmitter logic in accordance with a prescribed operation.

14. The method as in claim 13, wherein the step of computing comprises incrementing a counter to a stop value that corresponds to a period for the PLL to stabilize, and the step of latching is further based upon the stop value and a reset deassert signal.

15. The method as in claim 13, further comprising generating the encoded signals according to NRZI protocol from an NRZ signal in response to the secondary reset signal and the basic clock signal.

16. The method as in claim 13, further comprising generating the encoded signals according to MLT-3 protocol from an NRZ signal in response to the secondary reset signal and the transmit clock signal.

17. The method as in claim 13, wherein the encoded signals conform to an IEEE 802.3 protocol.

* * * * *